(12) United States Patent
Zhou et al.

(10) Patent No.: US 9,838,864 B2
(45) Date of Patent: Dec. 5, 2017

(54) POWER EFFICIENT AVAILABILITY ADVERTISING AND DISCOVERY

(71) Applicant: QUALCOMM Incorporated, San Diego, CA (US)

(72) Inventors: Yan Zhou, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/929,804

(22) Filed: Nov. 2, 2015

(65) Prior Publication Data

US 2016/0127883 A1 May 5, 2016

Related U.S. Application Data

(60) Provisional application No. 62/075,681, filed on Nov. 5, 2014.

(51) Int. Cl.
| | |
|---|---|
| H04W 8/00 | (2009.01) |
| H04W 4/00 | (2009.01) |
| H04W 52/02 | (2009.01) |
| H04W 84/18 | (2009.01) |

(52) U.S. Cl.
CPC .......... *H04W 8/005* (2013.01); *H04W 4/008* (2013.01); *H04W 52/0245* (2013.01); *H04W 84/18* (2013.01); *Y02B 60/50* (2013.01)

(58) Field of Classification Search
CPC . H04W 8/005; H04W 4/008; H04W 52/0245; H04W 84/18

USPC ......................................................... 455/41.1
See application file for complete search history.

(56) References Cited

U.S. PATENT DOCUMENTS

| | | | | |
|---|---|---|---|---|
| 6,307,843 | B1 * | 10/2001 | Okanoue ................. | H04L 45/02 370/312 |
| 8,160,056 | B2 * | 4/2012 | Van der Merwe ...... | H04L 45/04 370/351 |
| 8,218,463 | B2 * | 7/2012 | Hall ....................... | H04L 12/189 370/310 |
| 8,483,652 | B2 * | 7/2013 | Hall ........................ | A63F 13/10 455/404.1 |
| 8,751,159 | B2 * | 6/2014 | Hall ........................ | A63F 13/10 463/42 |
| 8,868,027 | B2 * | 10/2014 | Hall ........................ | A63F 13/10 455/404.1 |
| 9,118,428 | B2 * | 8/2015 | Hall ........................ | A63F 13/10 |
| 9,266,025 | B2 * | 2/2016 | Hall ........................ | A63F 13/10 |
| 9,277,503 | B2 * | 3/2016 | Palankar ............... | H04W 40/24 |
| 2008/0062891 | A1 * | 3/2008 | Van der Merwe ...... | H04L 45/04 370/254 |

(Continued)

*Primary Examiner* — Hai V Nguyen
(74) *Attorney, Agent, or Firm* — Toler Law Group, PC.

(57) ABSTRACT

A method of communication includes detecting receipt of an advertisement message by a first communication circuitry while monitoring communications transmitted according to a first communication protocol. The advertisement message may include an information element indicating that a second device is available to participate in a first local ad hoc wireless network using a second communication protocol. The method further includes, based on the detecting receipt of the advertisement message, enabling a second communication circuitry of the first device for forming the first local ad hoc wireless network between the first device and the second device.

20 Claims, 9 Drawing Sheets

(56) References Cited

U.S. PATENT DOCUMENTS

| | | | |
|---|---|---|---|
| 2008/0120129 A1* | 5/2008 | Seubert | G06Q 10/06 705/35 |
| 2011/0179346 A1* | 7/2011 | Dufour | G06Q 30/0251 715/234 |
| 2012/0209910 A1* | 8/2012 | Svendsen | G01C 21/3611 709/204 |
| 2013/0073387 A1* | 3/2013 | Heath | G06Q 30/02 705/14.53 |
| 2013/0073389 A1* | 3/2013 | Heath | G06Q 30/02 705/14.54 |
| 2014/0045483 A1* | 2/2014 | Whidden | H04M 1/24 455/420 |
| 2014/0098804 A1* | 4/2014 | Calcev | H04W 76/02 370/338 |
| 2014/0206382 A1* | 7/2014 | Shabtay | G01S 5/0284 455/456.1 |
| 2014/0355582 A1* | 12/2014 | Kamath | H04W 84/20 370/338 |
| 2015/0117305 A1* | 4/2015 | Palankar | H04W 40/24 370/328 |
| 2015/0245341 A1* | 8/2015 | Grant | H04B 7/18539 370/336 |
| 2015/0319029 A1* | 11/2015 | Abraham | H04W 4/008 370/310 |
| 2015/0319596 A1* | 11/2015 | Qi | H04B 1/3827 455/41.2 |
| 2015/0332258 A1* | 11/2015 | Kurabi | G06Q 20/401 705/71 |

* cited by examiner

POWER EFFICIENT AVAILABILITY ADVERTISING AND DISCOVERY

I. CLAIM OF PRIORITY

The present application claims priority from U.S. Provisional Patent Application No. 62/075,681 entitled "POWER-EFFICIENT AVAILABILITY ADVERTISING AND DISCOVERY," filed Nov. 5, 2014, the contents of which are incorporated by reference in their entirety.

II. FIELD

The present disclosure is generally related to electronic devices and more particularly to energy saving communication techniques for electronic devices.

III. DESCRIPTION OF RELATED ART

Advances in technology have resulted in smaller and more powerful electronic devices. Electronic devices include mobile devices, such as wireless telephones, personal digital assistants (PDAs), and paging devices. Mobile devices may be small, lightweight, and easily carried by users. Wireless telephones, such as cellular telephones, can communicate voice and data packets over wireless networks. Further, many wireless telephones include other types of devices that are incorporated therein. For example, a wireless telephone can also include a digital still camera, a digital video camera, a digital recorder, and an audio file player. Further, wireless telephones can process executable instructions, such as to initiate communications with other devices within a wireless network.

Some mobile devices support communications via local ad hoc wireless networks, such as networks that are compatible with a Neighbor Aware Network (NAN) specification or with a WiFi Direct® specification. These devices may use the local ad hoc wireless network to share services with one another, such as streaming media, connections to wide area networks, etc.

Discovery and set up of local ad hoc wireless networks can use significant battery power. For example, a mobile device may use a relatively high power transceiver circuit to communicate via a local ad hoc wireless network. Accordingly, this relatively high power transceiver circuit may be periodically used to scan for networks that the mobile device can join. Such periodic scans can consume significant power reducing total battery life associated with the mobile device.

IV. SUMMARY

In a particular aspect of the disclosure, a method of communication includes detecting receipt of an advertisement message by a first communication circuitry while monitoring communications transmitted according to a first communication protocol. The advertisement message may have an information element indicating that a second device is available to participate in a local ad hoc wireless network using a second communication protocol. The method further includes, based on detecting receipt of the advertisement message, enabling a second communication circuitry of the first device for forming the local ad hoc wireless network between the first device and the second device.

In another particular aspect of the disclosure, an apparatus includes a first transceiver configured to communicate according to a first communication protocol and configured to detect receipt of an advertisement message transmitted according to the first communication protocol. The advertisement message may have an information element indicating that a second device is available to participate in a local ad hoc wireless network using a second communication protocol. The apparatus also includes a second transceiver configured to communicate according to the second communication protocol. The apparatus further includes a power-saving circuitry configured to selectively enable the second transceiver, based on detecting receipt of the advertisement message, for forming the local ad hoc wireless network with the second device.

In another particular aspect of the disclosure, a computer-readable medium stores instructions that are executable by a processor to cause the processor to perform operations. The operations include using a first communication circuitry to monitor communications according to a first communication protocol. The operations further include detecting receipt, by the first communication circuitry, of an advertisement message where the advertisement message has an information element indicating that a second device is available to participate in a local ad hoc wireless network using a second communication protocol. The operations also include, based on detecting receipt of the advertisement message, enabling a second communication circuitry for forming the local ad hoc wireless network between a first device and the second device.

One particular advantage provided by at least one of the disclosed aspects is that a mobile device consumes less power by scanning for devices capable of establishing local ad hoc wireless networks and/or by set-up of local ad hoc wireless networks using a relatively low power transceiver. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Illustrative examples are described below with reference to the drawings. In the description and the drawings, common features are designated by common reference numbers for convenience.

In a particular aspect, a mobile device may include a first transceiver, which is a relatively low power transceiver, and a second transceiver, which is a relatively high power transceiver. That is, the first transceiver is more energy efficient than the second transceiver. The mobile device may be configured to communicate via a local ad hoc wireless network using the second transceiver. The mobile device may be configured to use the first transceiver to advertise availability to participate in a local ad hoc wireless network, to scan for other devices that are available to participate in a local ad hoc wireless network, to exchange set-up information related to formation of a local ad hoc wireless network, or a combination thereof.

For example, the first transceiver may be configured to operate in accordance with a Bluetooth® low energy (BLE) specification (Bluetooth® is a registered trademark of Bluetooth SIG, Inc.), or another low energy consumption communication specification. In this example, the second transceiver may be configured to operate in accordance with a NAN specification, a WiFi Direct® specification (WiFi Direct® is a registered trademark of Wi-Fi Alliance), or another higher data rate and higher energy consumption communication specification. In this example, the first transceiver may send advertisement messages according to the BLE specification. The advertisement messages may indicate that the mobile device is available to participate in a local ad hoc wireless network using communications conforming to the NAN specification or the WiFi Direct® specification. The mobile device may also use the first transceiver to detect advertisement messages transmitted by other devices according to the BLE specification, where the advertisement messages indicate that the other devices are available to participate in a local ad hoc wireless network using communications conforming to the NAN specification or the WiFi Direct® specification.

After detecting receipt of an advertisement message, if the mobile device determines to set up or join a local ad hoc wireless network, network set-up information (such as communication credentials, communication addresses, channels, transmission schedules, etc.) may be exchanged using the first transceiver. Thus, the second transceiver may be maintained in a low-power state (e.g., a standby state) until a time to begin communicating via the local ad hoc wireless network. Accordingly, power consumption associated with scanning for devices capable of establishing local ad hoc wireless networks and/or set up of local ad hoc wireless networks may be significantly reduced.

Figure 1:
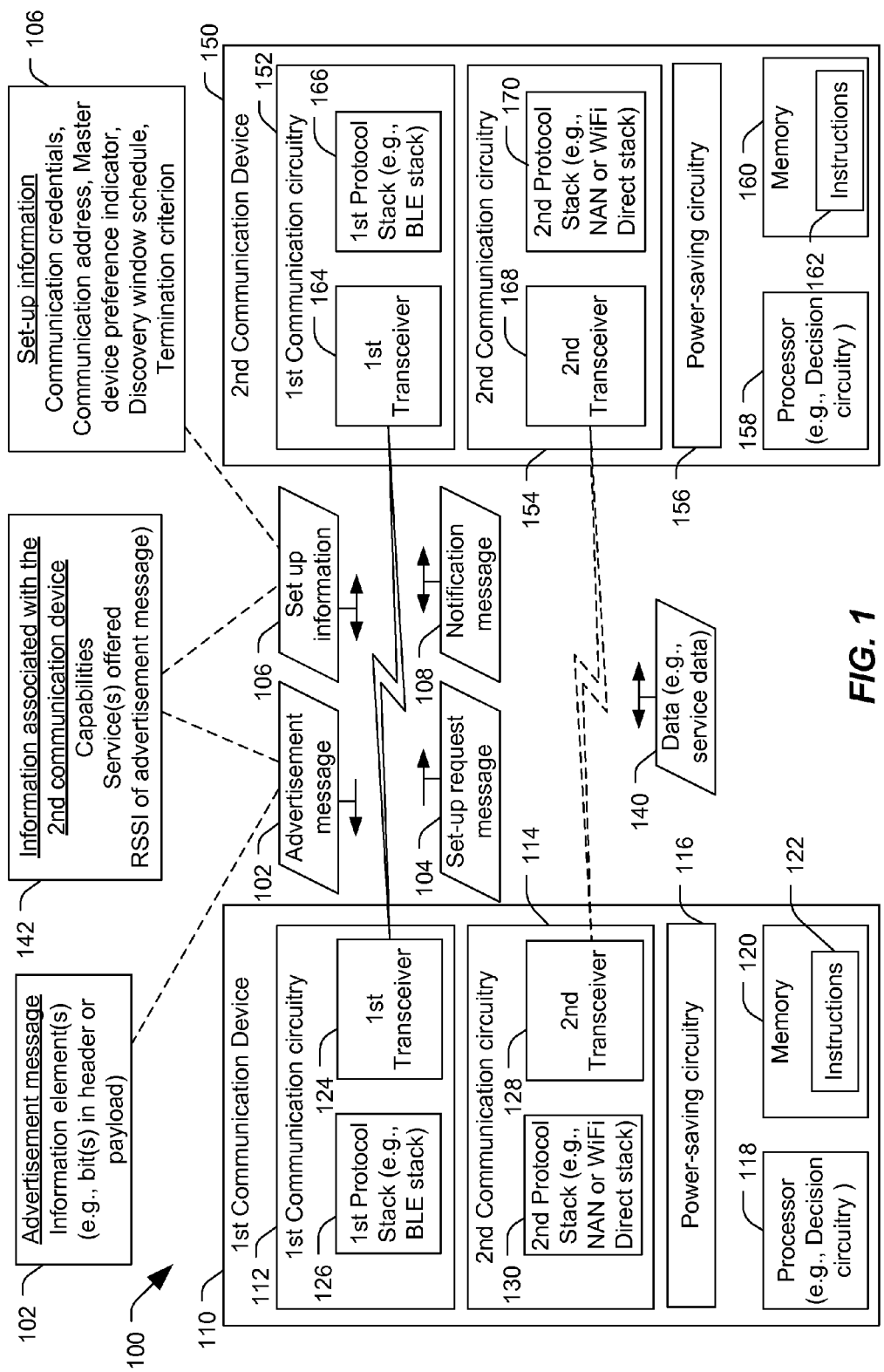
FIG. 1 is a block diagram of a particular example of a communication system.

FIG. 1 illustrates a particular example of a communication system 100 including a first communication device 110 and a second communication device 150. The communication devices 110, 150 may be mobile telephony devices, mobile computing devices, or other mobile devices, such as tablet computers. Each communication device 110, 150 includes two or more sets of communication circuitry and a power-saving circuitry. For example, the first communication device 110 includes a first communication circuitry 112, a second communication circuitry 114, and a power-saving circuitry 116. The power-saving circuitry 116 may be configured to selectively enable the second communication circuitry 114. For example, the power-saving circuitry 116 may be configured to switch the second communication circuitry 114 between a low power state, such as a stand-by state or sleep state, and a high power state, such as an active state. Similarly, the second communication device 150 may include a first communication circuitry 152, a second communication circuitry 154, and a power-saving circuitry 156.

The second communication circuitry 114 of the first communication device 110 may be less energy efficient than the first communication circuitry 112 of the first communication device 110. Likewise, the second communication circuitry 154 of the second communication device 150 may be less energy efficient than the first communication circuitry 152 of the second communication device 150. For example, a first operating energy consumption level of the first communication circuitry 152 may be less than a second operating energy consumption level of the second communication circuitry 154. To illustrate, an average or peak transmission power of the first communication circuitry 152 may be lower than an average or peak transmission power of the second communication circuitry 154. In another example, the first communication circuitry 152 may have a lower duty cycle (e.g., spend more time in a sleep or standby state) than a duty cycle of the second communication circuitry. The power-saving circuitry 156 may be configured to selectively enable the second communication circuitry 154.

Thus, during a particular interval, total power consumption associated with operation of the first communication circuitry 112 may be less than total power consumption associated with operation of the second communication circuitry 114 for the same interval. Likewise, during a particular interval, total power consumption associated with operation of the first communication circuitry 152 may be less than total power consumption associated with operation of the second communication circuitry 154 for the same interval. For example, the first communication circuitry 112 may be used to send and receive data using a first communication protocol, and the second communication circuitry 114 may be used to send and receive data using a second communication protocol. Each communication protocol (e.g., the first communication protocol and the second communication protocol) may specify or utilize a schedule of alternating asleep and awake periods. The first communication protocol may use awake periods that are less frequent than the awake periods used by the second communication protocol, may use awake period durations that are shorter than awake period durations used by the second communication protocol, or both. Further, the first communication circuitry 112 may be lower power circuitry than the second communication circuitry 114. To illustrate, for a particular time period during which the first communication circuitry 112 and the second communication circuitry 114 are awake, the first communication circuitry 112 may use less power than is used by the second communication circuitry 114. As another example, for the same wakeup period schedule, the first communication circuitry 112 may use less power than is used by the second communication circuitry 114. Thus, the second communication circuitry 114, 154 may be less energy efficient than the corresponding first communication circuitry 112, 152 in view of distinct power consumption characteristics of the communication circuitry, in view of different awake period duration of the communication protocols, in view of different awake period interval of the communication protocols, or a combination thereof.

In a particular aspect, the first communication circuitry 112 and 152 may correspond to Bluetooth® Low Energy (BLE) communication circuitry. To illustrate, the first communication circuitry 112 may include may include a first transceiver 124 and first protocol stack 126. The first protocol stack 126 may be a low energy protocol stack, such as a BLE protocol stack, configured to send and receive information via the first transceiver 124 according to a BLE specification. Likewise, the first communication circuitry 152 may include a first transceiver 164 and a first protocol stack 166. The first protocol stack 166 may be a low energy protocol stack, such as a BLE protocol stack. Accordingly, the first protocol stack 166 may be configured to transmit and receive data using the first transceiver 164 according to a BLE specification. The protocol stacks 126, 166 may include hardware, software, or both, that enables the communication devices 110, 150 to operate according to a particular communication protocol.

The second communication circuitry 114 of the first communication device 110 may include a second transceiver 128 and a second protocol stack 130. Likewise, the second communication circuitry 154 of the second communication device 150 may include a second transceiver 168 and a second protocol stack 170. The second communication circuitry 114, 154 may be configured to communicate according to a "higher energy protocol" than the protocol used by the first communication circuitry 112, 152. For example, the second communication circuitry 114, 154 may utilize a protocol that conforms to a NAN specification or a WiFi Direct® specification. As used herein, a "low energy protocol" refers to a protocol that uses a relatively more energy efficient transceiver than a higher energy protocol, and a "higher energy protocol" refers to a protocol that uses a relatively less energy efficient transceiver than a low energy protocol. The protocol stacks 130, 170 may include hardware, software, or both, that enables the communication devices 110, 150 to operate according to a particular communication protocol.

The first communication device 110 may also include a processor 118 (e.g., a decision circuitry) and a memory 120. The memory 120 may store instructions 122 that are executable by the processor 118 to process data received via the first communication circuitry 112, the second communication circuitry 114, a user input device (not shown), the power-saving circuitry 116, other components or devices of the first communication device 110, or a combination thereof. The instructions 122 may also enable the processor 118 to make decisions based on the data, such as a decision to place the second communication circuitry 114 in a low power state, a decision to place the second communication circuitry 114 in a high power state, a decision to join or set up a local ad hoc wireless network with another device (e.g., the second communication device 150), etc. Likewise, the second communication device 150 may include a processor 158 and a memory 160. The memory 160 may include instructions 162 that are executable by the processor 158 to process data received via the first communication circuitry 152, the second communication circuitry 154, a user input device (not shown), the power-saving circuitry 156, other components or devices of the second communication device 150, or a combination thereof, and to make decisions based on the data.

In a particular aspect, each of the communication devices 110, 150 is configured to use the respective second communication circuitry 114, 154 to participate in local ad hoc wireless networks, such as NAN or WiFi Direct® networks. However, to save power, while a particular device (e.g., the first communication device 110 or the second communication device 150) is not participating in a local ad hoc wireless network using its second communication circuitry, the particular device may place the second communication circuitry in a low power state and advertise its availability to participate in the local ad hoc wireless network using the respective first communication circuitry 112, 152. Similarly, each of the communication devices 110, 150 may use its respective first communication circuitry 112, 152 to monitor for (e.g., scan for) advertisements indicating availability of other devices to participate in a local ad hoc wireless network. Thus, since the first communication circuitry 112, 152 is more energy efficient than the second communication circuitry 114, 154, energy that would be consumed by the second communication circuitry 114, 154 to advertise availability and monitor for other devices is saved.

For example, during operation, while the second communication circuitry 154 of the second communication device 150 is in a low-power state, the second communication device 150 may transmit an advertisement message 102 using the first communication circuitry 152. Accordingly, the advertisement message 102 may be transmitted using a first relatively low power communication protocol, such as a protocol that conforms to a BLE specification. The advertisement message 102 may have one or more information elements that indicate capabilities of the second communication device 150 and/or that indicate that the second communication device 150 is available to participate in a local ad hoc wireless network, such as a NAN network or WiFi Direct® network. As explained above, the second network may utilize a relatively high powered protocol, such as a protocol that conforms to the NAN specification or the WiFi Direct® specification.

The first communication device 110 may be configured to periodically, occasionally, or continuously scan for advertisement messages using the first transceiver 124 while the second communication circuitry 114 of the first communication device 110 is in a low-power state. In response to detecting receipt of an advertising message, such as the advertisement message 102, the first communication circuitry 112 may provide information to the processor 118. The processor 118 may determine whether the advertisement message 102 included an information element indicating that the device that transmitted the advertisement message 102 is available to participate in a local ad hoc wireless network. In a particular example, the second communication device 150 may indicate its availability to participate in a local ad hoc wireless network using a single bit in a header or payload of the advertisement message 102. In this example, a component of the first protocol stack 126 (e.g., a Coder/Decoder (CODEC) configured to decode messages based on the first communication protocol) may detect presence of the bit and provide information to the processor 118 indicating that the device (e.g., the second communication device 150) that transmitted the advertisement message 102 is available to participate in a local ad hoc wireless network.

After detecting receipt of the advertisement message 102, the processor 118 may perform a determination of whether to form a local ad hoc wireless network with the second communication device 150. For example, the processor 118 may determine whether to form the local ad hoc wireless network with the second communication device 150 based on information 142 associated with the second communication device 150. To illustrate, the processor 118 may determine whether to form the local ad hoc wireless network with the second communication device 150 based on a comparison of the information 142 to decision criteria. The information 142 may include, for example, an indication of capabilities of the second communication device 150, an indication of services offered (e.g., made available) by the second communication device 150, a received signal strength indication (RSSI) associated with the advertisement message 102 or associated with the second communication device 150, other information pertinent to determining whether to form the local ad hoc wireless network, or any combination thereof.

In a particular implementation, the processor 118 determines the information 142 based on the advertisement message 102. For example, the advertisement message 102 may include one or more additional information elements. The one or more additional information elements may correspond to portions of the information 142, such as the indication of capabilities of the second communication device 150 and the indication of services offered (e.g., made available) by the second communication device 150. As another example, the processor 118 may determine the RSSI associated with the advertisement message 102 or associated with the second communication device 150 to estimate signal strength or data rate that would be available for the local ad hoc wireless network. The RSSI may be compared to a threshold to determine whether to form the local ad hoc wireless network with the second communication device 150. In another particular implementation, the processor 118 determines the information 142 based on additional information sent by the second communication device 150 after transmission of the advertisement message 102. For example, the advertisement message 102 may be a small message, to conserve power, and the advertisement message 102 may not include information related to capabilities of the second communication device 150. In this example, the first communication device 110 may request additional information from the second communication device 150 after detecting receipt of the advertisement message 102.

To illustrate, the first communication device 110 may send a set-up request message 104 to the second communication device 150 after detecting receipt of the advertisement message 102. In this illustrative example, the second communication device 150 may exchange set-up information 106 with the first communication device 110, and the processor 118 may determine whether to form the local ad hoc wireless network with the second communication device 150 based on the set-up information 106, the advertisement message 102, or both.

If the processor 118 determines that it is desirable to set up the local ad hoc wireless network with the second communication device 150 based on the information 142, the first communication device 110 may enable the second communication circuitry 114 to set up the local ad hoc wireless network. For example, the processor 118 may instruct the power-saving circuitry 116 to transition the second communication circuitry 114 from the low power state to a high power state. The local ad hoc wireless network may then be set up to enable data 140 to be exchanged between the communication devices 110, 150 using the respective second communication circuitry 114, 154. For example, the data 140 may be exchanged to enable the first communication device 110 to share a service (such as a data connection to another network) that is provided by the second communication device 150.

In a particular implementation, the set-up information 106 is exchanged between the first communication device 110 and the second communication device 150 using the respective second communication circuitry 114, 154. In this implementation, the set-up information 106 may be exchanged after the second communication circuitry 114, 154 transitions from the low power state to the high power state. For example, after sending the set-up request message 104, the first communication device 110 may use the first communication circuitry 112 to receive a set-up confirmation message from the second device 150. The second communication circuitry 114 of the first communication device 110 may be enabled after the set-up confirmation message is received. Subsequently, the second communication circuitry 114 may be used to exchange the set-up information 106 associated with formation of the local ad hoc wireless network with the second device 150. Thus, in this implementation, advertising availability and monitoring for available devices is performed using the more energy efficient communication circuitry (e.g., the first communication circuitry 112, 152), and network set up and operation is performed using the higher power circuitry (e.g., the second communication circuitry 114, 154).

In another particular implementation, the set-up information 106 is exchanged between the first communication device 110 and the second communication device 150 using the respective first communication circuitry 112, 152 after receipt of the advertisement message 102 is detected. For example, after sending the set-up request message 104, the first communication device 110 may use the first communication circuitry 112 to receive a set-up confirmation message from the second device 150. Subsequently, the first communication circuitry 112 may be used to exchange the set-up information 106 associated with formation of the local ad hoc wireless network with the second device 150. In this implementation, the second communication circuitry 114 may be enabled after the set-up information 106 is exchanged.

Thus, in this implementation, advertising availability, monitoring for available devices, and network set-up data exchange is performed using the more energy efficient communication circuitry (e.g., the first communication circuitry 112, 152). For example, the set-up information 106 may be exchanged using one or more BLE data frames (e.g., scan request/response frames or special purpose frames for exchanging the set-up information 106) or a BLE data connection.

The set-up information 106 may include information utilized by the second communication circuitry 114, 154 to establish the local ad hoc wireless network. For example, the set-up information 106 may include communication credentials, communication addresses, control preference indicators (e.g., master device preference indicators or group owner preference indicators), wakeup time schedules for transmission and reception (e.g., discovery window schedules), operation channel number, termination criteria, other information, or a combination thereof. In a particular implementation, the set-up information 106 includes the termination criteria. For example, the first communication circuitry 112, 152 may be used to exchange the termination criterion after sending the set-up request message or within the set-up request message. The termination criteria may specify when or under what circumstances attempts to form the local ad hoc wireless network should be ceased.

For example, the termination criteria may include a time limit. The time limit may indicate a time allowed for the second communication circuitry 114, 154 to establish the local ad hoc wireless network (e.g., to complete a handshake process, to exchange set-up information, etc.). If the local ad hoc wireless network is not established prior to the time limit specified by the termination criteria, the power-saving circuitry 116, 156 may transition the second communication circuitry 114, 154, respectively, to the low power state. Additionally, in a particular aspect, either or both of the first communication circuitries 112, 152 may send a notification message 108. The notification message 108 may indicate that attempts to set up the local ad hoc wireless network have been terminated. Thus, rather than continue to expend energy by utilizing the relatively high power second communication circuitry 114, 154 to set up the local ad hoc wireless network, the second communication circuitry 114, 154 may be transitioned to the low powered state again, and the first communication circuitry 112, 152 may be used to notify respective devices of the failure of the set-up attempts. After the notification message 108 is sent, the first communication circuitry 112, 152 may exchange additional set-up information to make another attempt to set up the local ad hoc wireless network, or the communication devices 110, 150 may, at least temporarily, cease attempting to set up the local ad hoc wireless network.

Accordingly, the communication system 100 enables relatively low power monitoring for devices that are available to establish a local ad hoc wireless network. The communication system 100 may also enable relatively low power set up of the local ad hoc wireless network by exchanging set-up data for the local ad hoc wireless network via a lower power network. To illustrate rather than utilizing the second communication circuitry 114 to monitor for advertisement messages, the first communication device 110 may save energy by using relatively low power communication circuitry, such as the first communication circuitry 112, to monitor for advertisement messages.

Figure 2:
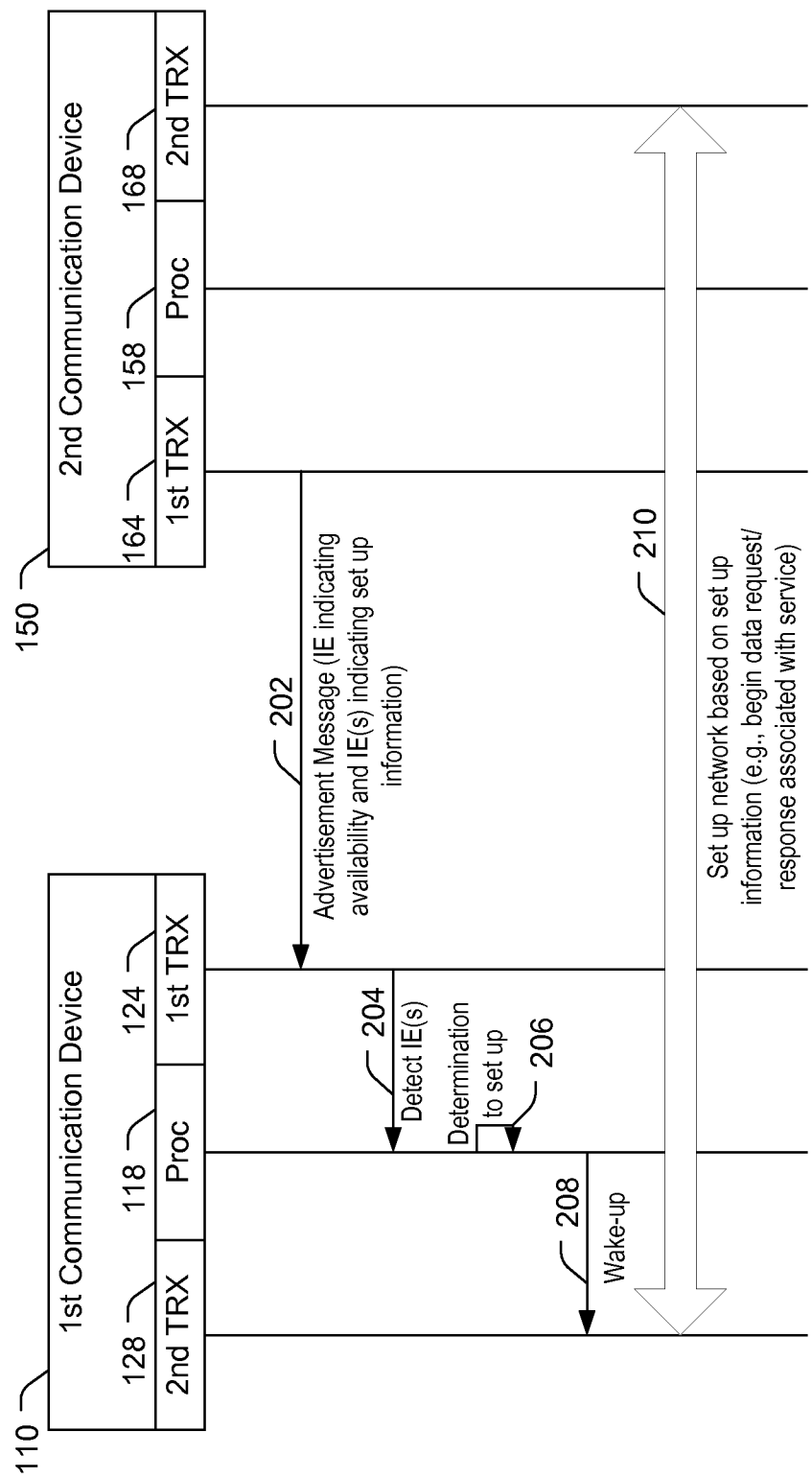
FIG. 2 is a diagram illustrating a first example of communications of devices in the communication system of FIG. 1.

FIG. 2 is a diagram illustrating a first example of communications between the first communication device 110 and the second communication device 150 of FIG. 1. In FIGS. 2-6 only a few of the components of each of the communication devices 110, 150 are illustrated to simplify the description. For example, the first transceiver 124, the second transceiver 128, and the processor 118 of the first communication device 110, and the first transceiver 164, the second transceiver 168, and the processor 158 of the second communication device 150 are shown.

In the example illustrated in FIG. 2, the second communication device 150 transmits, at 202, an advertisement message having one or more information elements indicating availability of the second communication device 150 to participate in a local ad hoc wireless network (e.g., a NAN or WiFi Direct® network). For example, the one or more information elements may include one or more bits in a physical layer and/or MAC layer header of the advertisement message or one or more bits in a payload of the advertisement message. In the example illustrated in FIG. 2, the advertisement message also includes one or more additional information elements indicating set-up information associated with the second communication device 150. For example, as explained above, the set-up information may identify a service offered (e.g., made available) by the second communication device 150, a communication capability of the second communication device 150, communication credentials, a communication address, a control preference indicator (e.g., a master device preference indicator or a group owner preference indicator), a wakeup time schedule for transmission and reception (e.g., a discovery window schedule), an operation channel number, termination criteria, other information, or a combination thereof.

The first communication device 110 may detect the information elements, at 204, after receiving the advertisement message. The processor 118 may determine, based on the information elements, whether to set up the local ad hoc wireless network with the second communication device 150, at 206. For example, the processor 118 may determine whether a service offered by the second communication device 150 is desired for use at the first communication device 110. As another example, the processor 118 may compare a communication capability of the second communication device 150 to a criterion to determine whether the communication capability of the second communication device 150 satisfies the criterion. To illustrate, the criterion may include a quality of service (QoS) criterion associated with a particular service. Accordingly, if the second communication device 150 is able to provide the particular service and is able to satisfy the QoS criterion, the processor 118 may determine to set up the local ad hoc wireless network. As another example, the processor 118 may determine whether a RSSI associated with the advertisement message indicates that a data rate for communications between the first communication device 110 and the second communication device 150 is satisfactory.

When the processor 118 determines the desirability of setting up the local ad hoc wireless network, the processor 118 may cause the second transceiver 128 to wake up (e.g., transition from a low power state to a higher power state), at 208. The processor 118 may also provide the set-up information to the second transceiver 128 to enable the second transceiver 128 to set up the local ad hoc wireless network. The second transceiver 128 of the first communication device 110 and the second transceiver 168 of the second communication device 150 may establish data communications, at 210, to set up the local ad hoc wireless network and to exchange data via the network.

In the example illustrated in FIG. 2, the second communication device 150 may send the advertisement message while the second transceiver 168 is awake (e.g., in the high power state), or the second communication device 150 may send the advertisement message while the second transceiver 168 is asleep or in standby (e.g., in the low power state). Accordingly, no step of waking the second transceiver 168 is shown. However, in certain implementations, the processor 158 of the second communication device 150 may wake up the second transceiver 168 after sending the advertisement message, as described further below.

Figure 3:
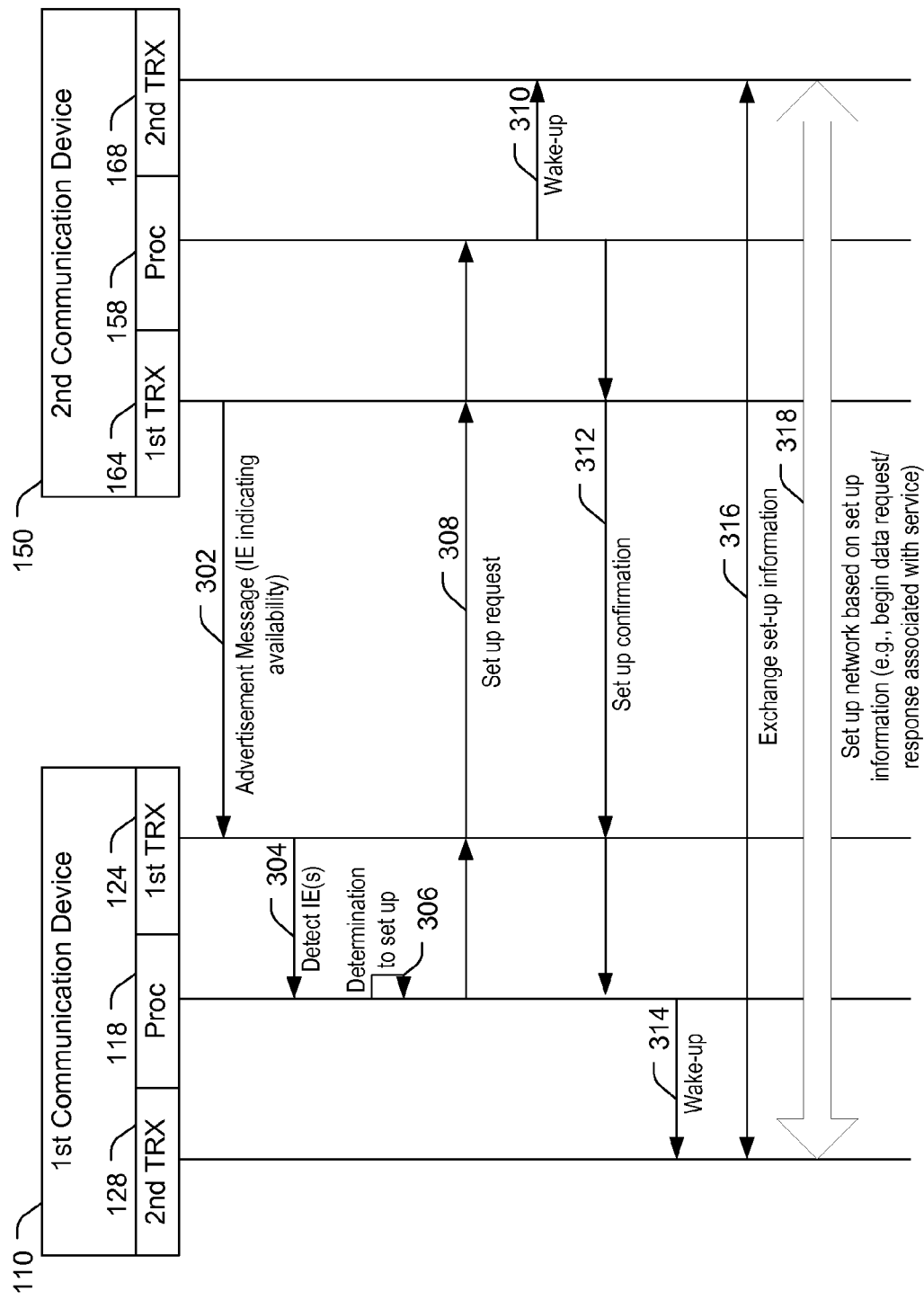
FIG. 3 is a diagram illustrating a second example of communications of devices in the communication system of FIG. 1.

FIG. 3 is a diagram illustrating a second example of communications between the first communication device 110 and the second communication device 150 of FIG. 1. In the example illustrated in FIG. 3, the second communication device 150 transmits, at 302, an advertisement message having one or more information elements indicating availability of the second communication device 150 to participate in a local ad hoc wireless network (e.g., a NAN or WiFi Direct® network). For example, the one or more information elements include one or more bits in a physical layer and/or MAC layer header of the advertisement message or one or more bits in a payload of the advertisement message.

The first communication device 110 may detect the information elements, at 304, after receiving the advertisement message. The processor 118 may determine, based on the information elements, whether to set up the local ad hoc wireless network with the second communication device 150, at 306. For example, the processor 118 may determine whether a RSSI associated with the advertisement message indicates that a data rate for communications between the first communication device 110 and the second communication device 150 is satisfactory.

When the processor 118 determines to set up the local ad hoc wireless network after detecting receipt of the advertisement message, the processor 118 may direct the first transceiver 124 to send a set-up request, at 308, to the second communication device 150. The set-up request message may request formation of the local ad hoc wireless network. In response to the set-up request, the second communication device 150 may utilize the first transceiver 164 to send a set-up confirmation message, at 312, to the first communication device 110 using the first communication protocol. Additionally, after receiving the set-up request, the processor 158 may wake up the second transceiver 168, at 310.

After receiving the set-up confirmation message, the processor 118 may wake up the second transceiver 128, at 314, and enable the second transceiver 128 exchange set-up information with the second transceiver 168 to set up the local ad hoc wireless network, at 316. Subsequently, the second transceiver 128 of the first communication device 110 and the second transceiver 168 of the second communication device 150 may establish data communications, at 318, to set up the local ad hoc wireless network and to exchange data via the network.

Figure 4:
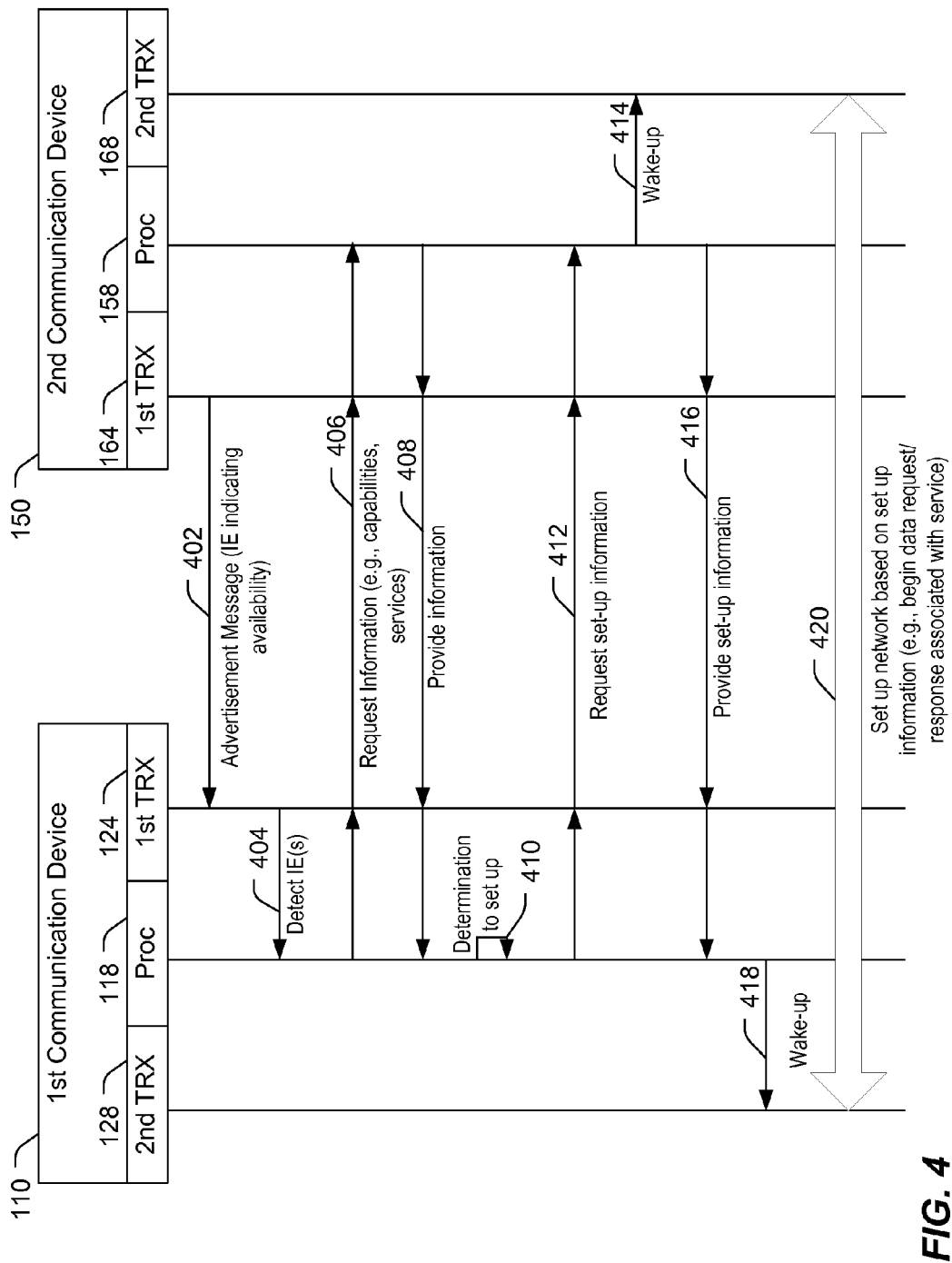
FIG. 4 is a diagram illustrating a third example of communications of devices in the communication system of FIG. 1.

FIG. 4 is a diagram illustrating a third example of communications between the first communication device 110 and the second communication device 150 of FIG. 1. In the example illustrated in FIG. 4, the second communication device 150 transmits, at 402, an advertisement message having one or more information elements indicating availability of the second communication device 150 to participate in a local ad hoc wireless network (e.g., a NAN or WiFi Direct® network). For example, the one or more information elements include one or more bits in a physical layer and/or a MAC layer header of the advertisement message or one or more bits in a payload of the advertisement message.

The first communication device 110 may detect the information elements, at 404, after receiving the advertisement message. In response to detecting the information elements, the first communication device 110 may use the first transceiver 124 to send a request for information regarding the second communication device 150, at 406. For example, the request may request information related to a communication capability of the second communication device 150, a service offered (e.g., made available) by the second communication device 150, network set-up information, etc.

At 408, the second communication device 150 may provide the requested information using the first transceiver 164. At 410, the processor 118 may determine, based on the information provided by the second communication device 150 in response to the request, based on the advertisement message, or both, whether to set up the local ad hoc wireless network with the second communication device 150. For example, the processor 118 may determine whether a service offered by the second communication device 150 is desired for use at the first communication device 110. As another example, the processor 118 may compare a communication capability of the second communication device 150 to a criterion to determine whether the communication capability satisfies the criterion. To illustrate, the criterion may include a quality of service (QoS) criterion associated with a particular service. Accordingly, if the second communication device 150 is able to provide the particular service and is able to satisfy the QoS criterion, the processor 118 may determine to set up the local ad hoc wireless network. As another example, the processor 118 may determine whether a RSSI associated with the advertisement message indicates that a data rate for communications between the first communication device 110 and the second communication device 150 is satisfactory.

When the processor 118 determines the desirability of setting up the local ad hoc wireless network, the first communication device 110 may use its first transceiver 124 to send a request for set-up information, at 412. The set-up information may indicate, for example, a communication capability of the second communication device 150, communication credentials, a communication address, a control preference indicator (e.g., a master device preference indicator or a group owner preference indicator), a wakeup time schedule for transmission and reception (e.g., a discovery window schedule), an operation channel number, termination criteria, other information, or a combination thereof. At 416, the second communication device 150 may use its first transceiver 164 to send the set-up information to the first communication device 110. Additionally, after receiving the request for information, at 406, or after receiving the request for set-up information, at 412, the processor 158 of the second communication device 150 may wake up the second transceiver 168, at 414.

At 418, the processor 118 of the first communication device 110 may wake up the second transceiver 128 after determining to set up the local ad hoc wireless network, at 410, or after receiving the set-up information, at 416. Subsequently the second transceiver 128 of the first communication device 110 and the second transceiver 168 of the second communication device 150 may establish data communications, at 420, to set up the local ad hoc wireless network and to exchange data via the network.

In a particular implementation, one or more of the communications illustrated in FIG. 4 may be omitted. For example, the request for information, at 406, and corresponding response, at 408, may be omitted. In this example, the first communication device 110 may determine whether to set up the local ad hoc wireless network with the second communication device 150 based on information provided in the advertisement message before sending the request for set-up information, at 412. Alternatively, in this example, the first communication device 110 may determine whether to set up the local ad hoc wireless network with the second communication device 150 based on information provided with the set-up information, at 416. As another example, the request for set-up information, at 412, and corresponding set-up information response, at 416, may be omitted. In this example, the set-up information may be exchanged using the second transceivers 128, 168.

Figure 5:
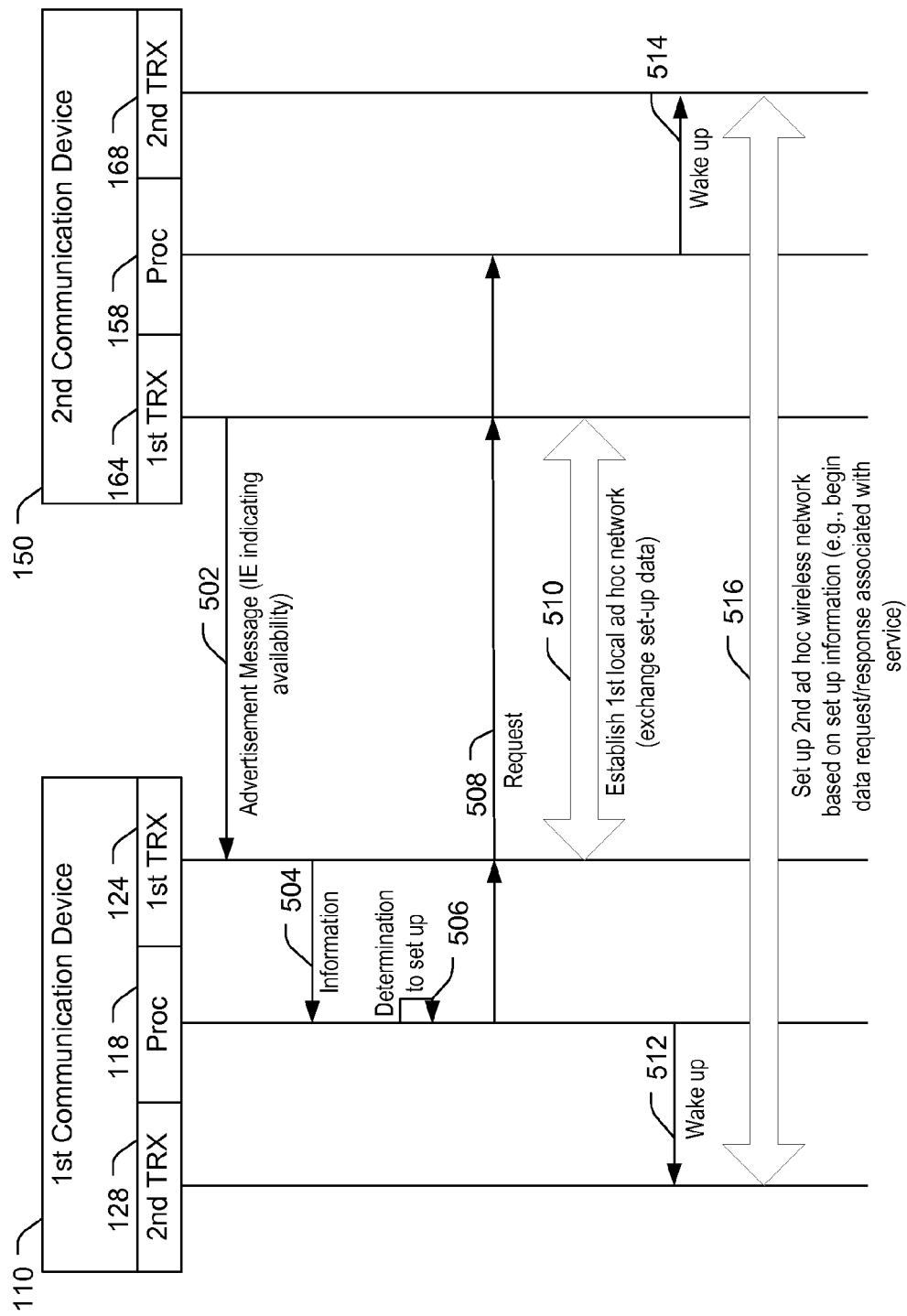
FIG. 5 is a diagram illustrating a fourth example of communications of devices in the communication system of FIG. 1.

FIG. 5 is a diagram illustrating a fourth example of communications between the first communication device 110 and the second communication device 150 of FIG. 1. In the example illustrated in FIG. 5, the second communication device 150 transmits, at 502, an advertisement message having one or more information elements indicating availability of the second communication device 150 to participate in a local ad hoc wireless network (e.g., a NAN or WiFi Direct® network). For example, the one or more information elements include one or more bits in a header of the advertisement message or one or more bits in a payload of the advertisement message.

The first communication device 110 may detect the information elements, at 504, after receiving the advertisement message. After detecting the information element, the first communication device 110 may use the first transceiver 124 to send a request, at 508, to the second communication device 150 to establish a first local ad hoc network. The first communication device 110 and the second communication device 150 may establish the first local ad hoc wireless network, at 510. For example the first local ad hoc wireless network may be a network established using a first communication protocol. For example, the first local ad hoc wireless network may correspond to a BLE specification compliant data connection. The first ad hoc wireless network may be used to exchange set-up data associated with a second ad hoc wireless network. For example set-up information associated with a NAN or WiFi Direct® compliant network may be exchanged between the first communication device 110 and the second communication device 150 using the BLE specification compliant data connection.

At 506, after detecting the information element, at 504, or after establishing the first local ad hoc network, at 510, the processor 118 may determine whether to set up the second local ad hoc wireless network with the second communication device 150. For example, the processor 118 may determine whether to set up the second local ad hoc wireless network based on the advertisement message (or information elements within the advertisement message), based on information exchanged over the first local ad hoc wireless network, or both.

When the processor 118 determines the desirability of setting up the local ad hoc wireless network, the processor 118 may wake up the second transceiver 128, at 512. Additionally, after receiving the request, at 508, or after establishing the first local ad hoc network, at 510, the processor 158 may wake up the second transceiver 168 of the second communication device 150, at 514. Subsequently the second transceiver 128 of the first communication device 110 and the second transceiver 168 of the second communication device 150 may establish data communications, at 516, to set up the local ad hoc wireless network and to exchange data via the network.

Figure 6:
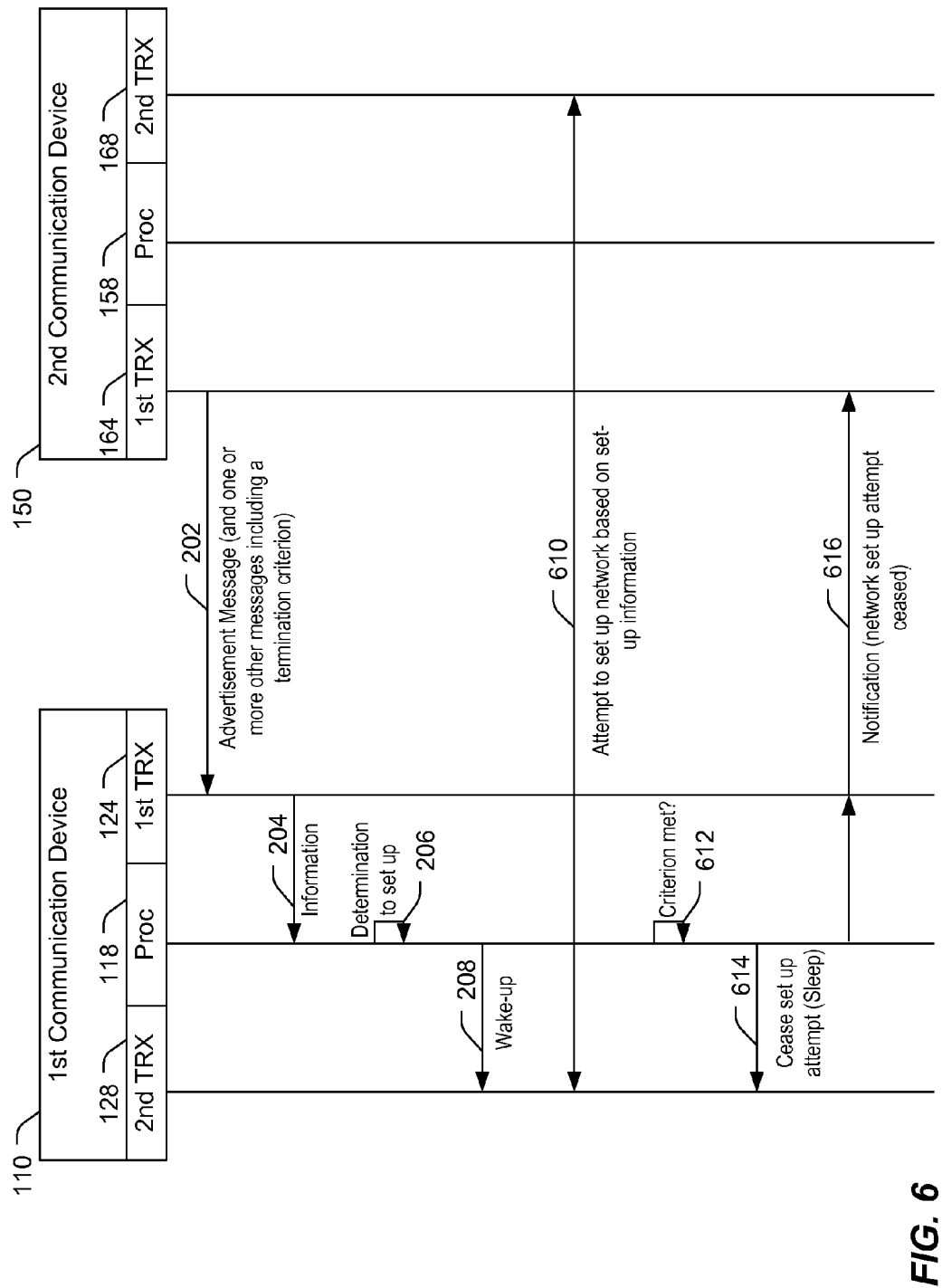
FIG. 6 is a diagram illustrating a fifth example of communications of devices in the communication system of FIG. 1.

FIG. 6 is a diagram illustrating a fifth example of communications between the first communication device 110 and the second communication device 150 of FIG. 1. In FIG. 6, one or both of the communication devices 110, 150 attempts to set up a local ad hoc wireless network using one of the processes described with reference to FIGS. 2-6. In the example illustrated in FIG. 6, the attempt to set up the local ad hoc wireless network is unsuccessful, and attempts to set up the local ad hoc wireless network are ceased based on a termination criterion. For ease of explanation, the attempt to set up the local ad hoc wireless network illustrate in FIG. 6 corresponds to the process described with reference to FIG. 2; however, the process described with reference to any of FIGS. 3-5, another process, or a combination thereof could be used instead.

In FIG. 6, as described in more detail with reference to FIG. 2, the second communication device 150 transmits an advertisement message, at 202, and the first communication device 110 detects the information elements, at 204. The processor 118 determines, based on the information elements, whether to set up the local ad hoc wireless network with the second communication device 150, at 206.

When the processor 118 determines the desirability of setting up the local ad hoc wireless network, the processor 118 causes the second transceiver 128 to wake up (e.g., transition from a low power state to a higher power state), at 208.

At 610, the second transceiver 128 may attempt to set up the local ad hoc wireless network with the second communication device 150. During attempts to set up the local ad hoc wireless network, the processor 118 may determine whether a termination criterion has been satisfied, at 612. The termination criterion may be indicated in the advertisement message, may be determined based on data exchanged by the communication devices 110, 150 using the respective first transceivers 124, 164 (e.g., in a set-up request/confirmation as in FIG. 3, in a request for information and response as in FIG. 4 or FIG. 5, in a request for set-up information and response as in FIG. 5, or in a BLE compliant data connection as in FIG. 5). The termination criterion may, for example, indicate a number of set-up attempts, a time limit, or another criterion related to set up of the local ad hoc wireless network.

When the termination criterion has been satisfied, the processor 118 may direct the second transceiver 128 to cease attempt to set up the local ad hoc wireless network, at 614. For example, the processor 118 may cause the second transceiver 128 to enter a low power state (e.g. a sleep state or standby state). Additionally, the processor 118 may cause the first transceiver 124 to send a notification indicating that the first communication device 110 has ceased attempts to set up the local ad hoc wireless network, at 616.

Although FIG. 6 illustrates the first communication device 110 determining whether the termination criterion has been satisfied and ceasing attempts to set up the local ad hoc wireless network, either or both of the communication devices 110, 150 may determine whether the termination criterion has been satisfied and may cease attempts to set up the local ad hoc wireless network. To illustrate, whichever communication device 110, 150 detects that the termination criterion has been satisfied may send a notification to the other communication device via the respective first transceivers 124, 164. Additionally, whichever communication device 110, 150 detects that the termination criterion has been satisfied may cause its second transceiver to enter a low power state. Thus, either or both of the first communication device 110 and the second communication device 150 may detect satisfaction of the termination criterion, cease attempts to set up the local ad hoc wireless network and/or notify the other device.

Figure 7:
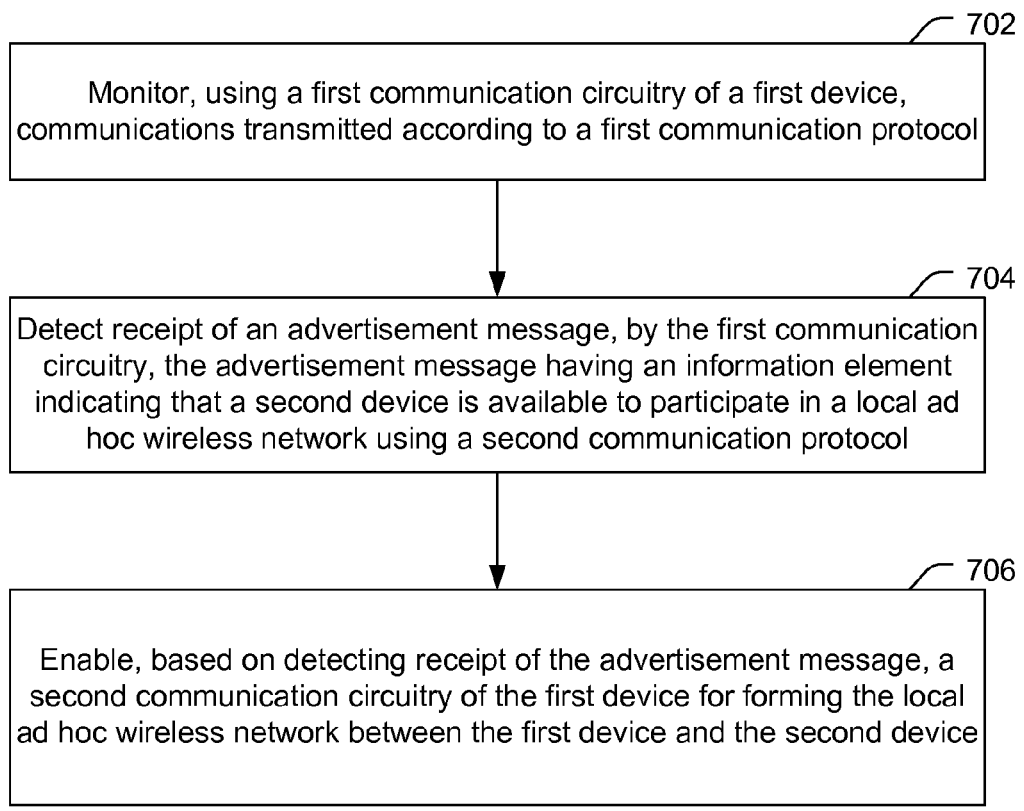
FIG. 7 is a flow chart illustrating a first particular example of a communication method.

FIG. 7 is a flow chart illustrating a first particular example of a communication method. The method of FIG. 7 may be performed by the first communication device 110 or the second communication device 150 of FIGS. 1-6. In particular, the method of FIG. 7 may be performed by a communication device that receives an advertisement message.

The method includes, at 702, monitoring, using a first communication circuitry of a first device, communications transmitted according to a first communication protocol. For example, the first communication device 110 may use the first communication circuitry 112 to monitor or scan for advertisement messages, such as the advertisement message 102, transmitted according to a first communication protocol (e.g., a BLE compliant protocol).

The method also includes, at 704, detecting receipt of an advertisement message, by the first communication circuitry. The advertisement message may include an information element indicating that a second device is available to participate in a local ad hoc wireless network using a second communication protocol. For example, the first communication device 110 may detect receipt of the advertisement message 102 sent by the second communication device 150. In this example, the advertisement message 102 may include one or more bits in a payload or in a header that indicate that the second communication device 150 is available to participate in a local ad hoc wireless network using a second communication protocol (such as a NAN compliant protocol or a WiFi Direct® compliant protocol).

The method also includes, at 706, based on detecting receipt of the advertisement message, enabling a second communication circuitry of the first device for forming the local ad hoc wireless network between the first device and the second device. For example, the power-saving circuitry 116 of the first communication device 110 may enable the second communication circuitry 114 after detecting receipt of the advertisement message 102. The first communication circuitry may be more energy efficient than the second communication circuitry. For example, a first operating energy consumption level of the first communication circuitry 112 may be less than a second operating energy consumption level of the second communication circuitry 114.

In a particular implementation, the method 700 may also include, after detecting receipt of the advertisement message, performing a determination of whether to form the local ad hoc wireless network with the second device. In this implementation, the second communication circuitry may be enabled further based on the determination (e.g., based on detecting receipt of the advertisement message and based on the determination). Additionally or in the alternative, in this particular implementation, determining whether to form the local ad hoc wireless network with the second device may include identifying a service to be made available by the second device via the local ad hoc wireless network. As another example, determining whether to form the local ad hoc wireless network with the second device may include determining, using the first communication circuitry, a received signal strength indication associated with the second device and comparing the received signal strength indication to a threshold. As another example, determining whether to form the local ad hoc wireless network with the second device may include determining, using the first communication circuitry, an indication of a communication capability of the second device and comparing the communication capability to a criterion.

Figure 8:
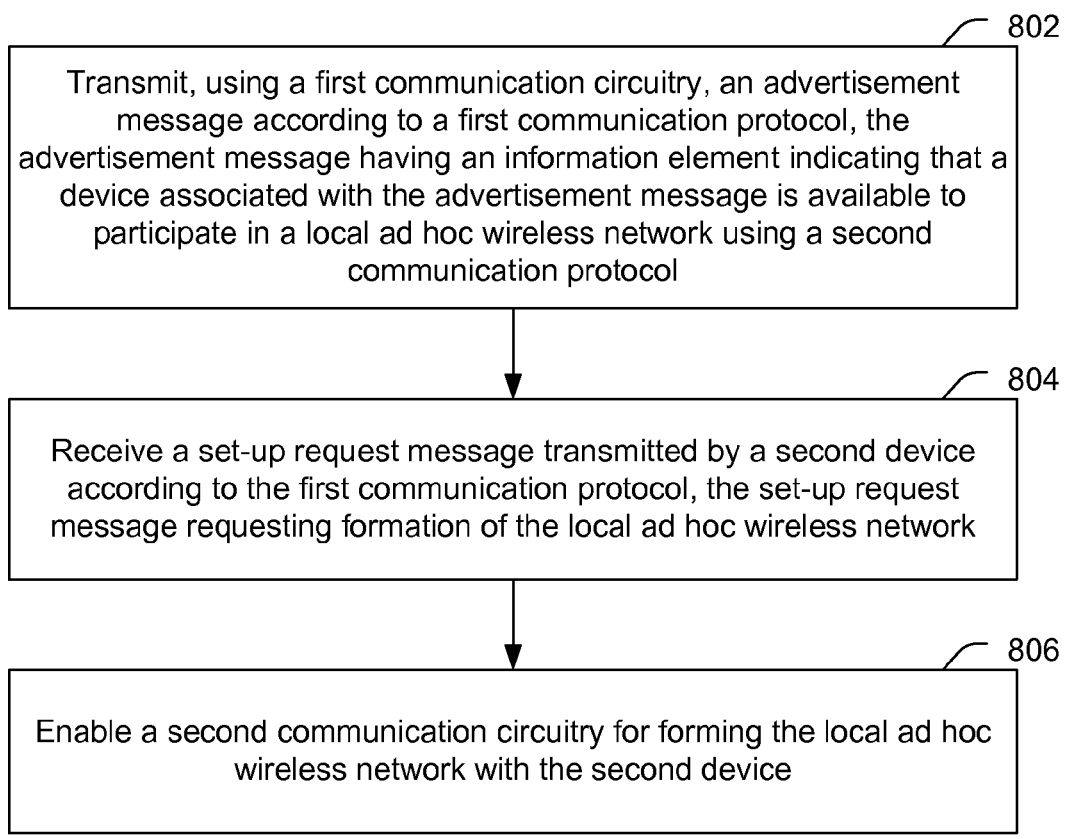
FIG. 8 is a flow chart illustrating a second particular example of a communication method.

FIG. 8 is a flow chart illustrating a second particular example of a communication method. The method of FIG. 8 may be performed by the first communication device 110 or the second communication device 150 of FIGS. 1-6. In particular, the method of FIG. 8 may be performed by a communication device that sends an advertisement message.

The method includes, at 802, transmitting, using a first communication circuitry, an advertisement message according to a first communication protocol. The advertisement message may include an information element indicating that a device associated with the advertisement message is available to participate in a local ad hoc wireless network using a second communication protocol. For example, the second communication device 150 may use the first communication circuitry 152 to transmit the advertisement message 102. The advertisement message 102 may include one or more bits in a payload or in a header that indicate that the second communication device 150 is available to participate in a local ad hoc wireless network using a second communication protocol (such as a NAN compliant protocol or a WiFi Direct® compliant protocol). The advertisement message 102 may be transmitted according to a first communication protocol (e.g., a BLE compliant protocol).

The method also includes, at 804, after transmitting the advertisement message, receiving a set-up request message transmitted by a second device according to the first communication protocol, the set-up request message requesting formation of the local ad hoc wireless network. For example, the second communication device 150 may receive the set-up request message 104 from the first communication device 110.

The method also includes, at 806, after receiving the set-up request message, enabling a second communication circuitry for forming the local ad hoc wireless network with the second device. For example, the power-saving circuitry 156 of the second communication device 150 may enable the second communication circuitry 154 for forming the local ad hoc wireless network with the first communication device 110 after receiving the set-up request message 104. The first communication circuitry may be more energy efficient than the second communication circuitry.

Figure 9:
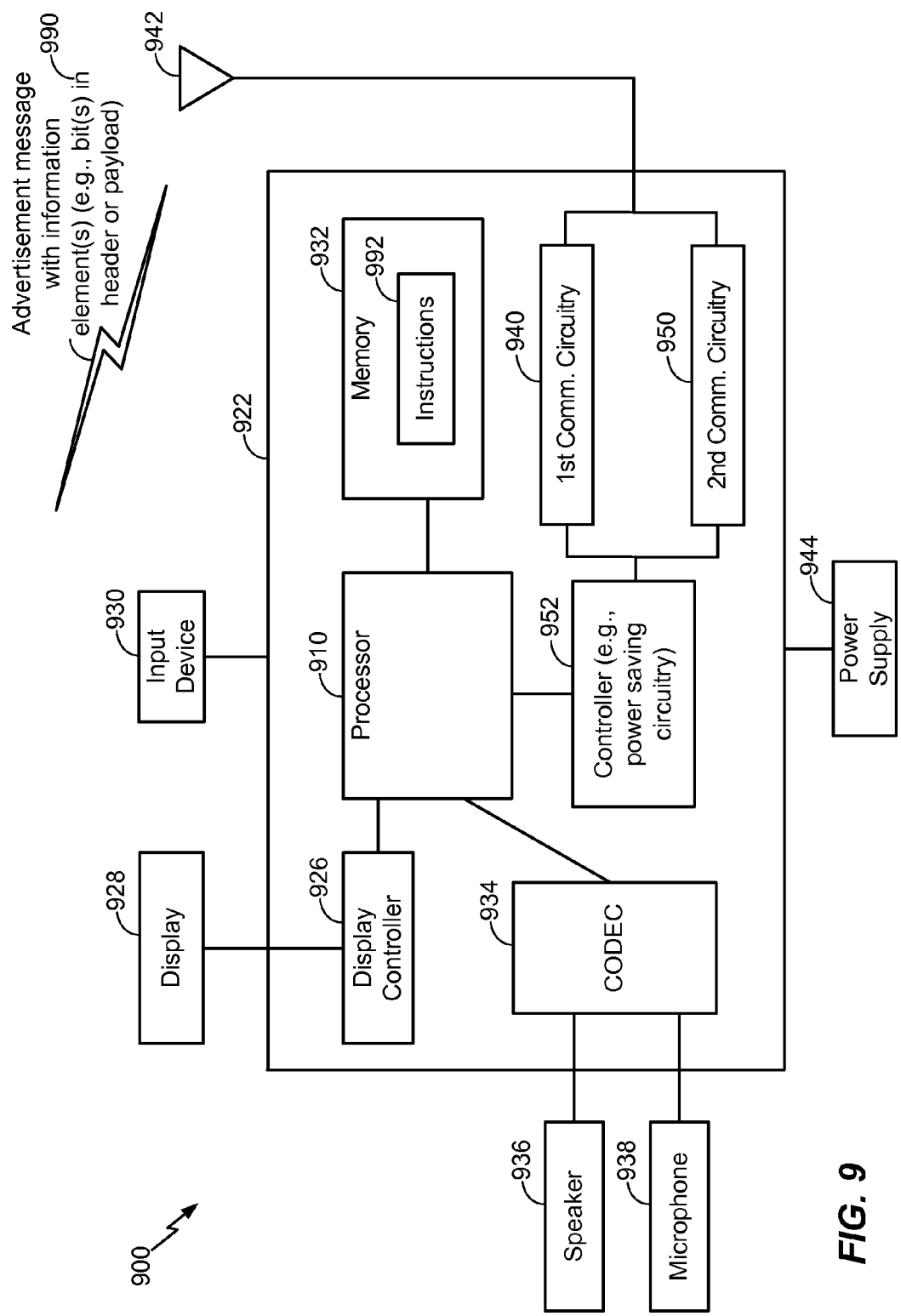
FIG. 9 is a block diagram of a particular illustrative example of a mobile device.

Referring to FIG. 9, a block diagram of a particular illustrative example of a device is depicted and generally designated 900. In a particular implementation, the device 900 corresponds to, includes, or is included within the first communication device 110 or the second communication device 150 of FIGS. 1-6.

The device 900 includes a first communication circuitry 940 and a second communication circuitry 950. The first communication circuitry 940 may be more energy efficient than the second communication circuitry 950. For example, the first communication circuitry 940 may be configured to transmit and receive data according to a first protocol, such as a BLE compliant protocol, and the second communication circuitry 950 may be configured to transmit and receive data according to a second protocol, such as a NAN compliant protocol or a WiFi Direct® compliant protocol.

The device 900 also includes a processor 910, such as a digital signal processor (DSP). The processor 910 may be coupled to a memory 932. The processor 910 may execute instructions 992 from the memory 932 and may read or store data at the memory 932. For example, the instructions 992 may be executable by the processor 910 to perform or initiate one or more operations described herein. To illustrate, the instructions 992 may be executable by the processor 910 to monitor communications transmitted according to a first communication protocol (e.g., using the first communication circuitry 940), to detect receipt of an advertisement message 990 indicating that a second device is available to participate in a local ad hoc wireless network using a second communication protocol, and to enable the second communication circuitry 950 for forming the local ad hoc wireless network between the first device and the second device. In another illustrative example, the instructions 992 may be executable by the processor 910 to transmit the advertisement message 990 according to a first communication protocol (e.g., using the first communication circuitry 940), where the advertisement message 990 indicates that the device 900 associated with the advertisement message is available to participate in a local ad hoc wireless network using a second communication protocol, to receive a set-up request message transmitted by a second device according to the first communication protocol, and to enable the second communication circuitry 950 for forming the local ad hoc wireless network with the second device.

The device 900 may also include a controller 952 coupled to the first and second communication circuitry 940, 950. The controller 952 may include a power-saving circuitry, such as the power-saving circuitry 116, 156 of FIG. 1. Alternately, functions described in FIG. 1 as being performed by the power-saving circuitry 116, 156 may be performed by a processor 910 executing instructions 992. The controller 952 may be configured to control operation of the first and second communication circuitry 940, 950. For example, the controller 952 may place either or both of the first and second communication circuitry 940, 950 in a low power state when the corresponding circuitry is not in use.

The device 900 may also include a display controller 926 that is coupled to the processor 910 and to a display 928. A coder/decoder (CODEC) 934 can also be coupled to the processor 910. A speaker 936 and a microphone 938 can be coupled to the CODEC 934. The device 900 may also include one or more antennas 942 coupled to or accessible to the processor 910 via the first and second communication circuitry 940, 950.

In a particular implementation, the processor 910, the display controller 926, the memory 932, the CODEC 934, the controller 952, the first communication circuitry 940 and the second communication circuitry 950 are included in a system-in-package or system-on-chip device 922. An input device 930 and a power supply 944 may be coupled to the system-on-chip device 922. Moreover, as illustrated in FIG. 9, the display 928, the input device 930, the speaker 936, the microphone 938, the antenna(s) 942, and the power supply 944, may be external to the system-on-chip device 922. However, each of the display 928, the input device 930, the speaker 936, the microphone 938, the antenna(s) 942, and the power supply 944 can be coupled to a component of the system-on-chip device 922, such as to an interface or to a controller.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into semiconductor chips. The chips are then employed in devices described above (e.g., within the device 900).

In a particular aspect, a computer-readable medium stores instructions that are executable by a processor to cause the processor to perform operations. The operations include using a first communication circuitry to monitor communications according to a first communication protocol. The operations further include detecting receipt, by the first communication circuitry, of an advertisement message where the advertisement message has an information element indicating that a second device is available to participate in a local ad hoc wireless network using a second communication protocol. The operations also include, based on detecting receipt of the advertisement message, enabling a second communication circuitry for forming the local ad hoc wireless network between a first device and the second device.

In a particular aspect, an apparatus according to a particular example described herein may include means for communicating according to a first communication protocol, such as the first communication circuitry 112 or 152 of FIG. 1, the first transceiver 124 or 164 of FIGS. 1-6, the first communication circuitry 940 of FIG. 9, other transmitters or receivers, other circuits that enable communication of signals according to the first communication protocol, or a combination thereof. The apparatus may also include means for communicating according to a second communication protocol, such as the second communication circuitry 114 or 154 of FIG. 1, the second transceiver 128 or 168 of FIGS. 1-6, the second communication circuitry 950 of FIG. 9, other transmitters or receivers, other circuits that enable communication of signals according to the second communication protocol, or a combination thereof.

The apparatus may also include means for detecting receipt of an advertisement message received by the means for communicating according to the first communication protocol, where the advertisement message has an information element indicating that a device associated with the advertisement message is available to participate in a local ad hoc wireless network using the second communication protocol. For example, the means for detecting receipt of an advertisement message may include the first communication circuitry 112 or 152 of FIG. 1, the first protocol stack 126 or 166 of FIG. 1, the processor 118 or 158 of FIGS. 1-6, the first communication circuitry 940 or the processor 910 of FIG. 9, other circuits that enable detection of bits within a header or payload of a message transmitted according to the first communication protocol, or a combination thereof.

The apparatus may further include means for selectively enabling the means for communicating according to the second communication protocol based on receipt of the advertisement message, where the means for communicating according to the second communication protocol, when enabled, is less energy efficient than the means for communicating according to the first communication protocol. For example, the means for selectively enabling may include the power-saving circuitry 116 or 156 of FIG. 1, the processor 118 or 158 of FIGS. 1-6, the controller 952 or the processor 910 of FIG. 9, other circuits that enable switching communication circuits between a high power state and a low power state, or a combination thereof.

In another particular aspect, an apparatus according to a particular example described herein may include means for communicating according to a first communication protocol to transmit an advertisement message, the advertisement message having an information element indicating that a device associated with the advertisement message is available to participate in a local ad hoc wireless network using a second communication protocol. For example, the means for communicating according to the first communication protocol may include the first communication circuitry 112 or 152 of FIG. 1, the first transceiver 124 or 164 of FIGS. 1-6, the first communication circuitry 940 of FIG. 9, other transmitters or receivers, other circuits that enable communication of signals according to the first communication protocol, or a combination thereof. The apparatus may also include means for communicating according to a second communication protocol, such as the second communication circuitry 114 or 154 of FIG. 1, the second transceiver 128 or 168 of FIGS. 1-6, the second communication circuitry 950 of FIG. 9, other transmitters or receivers, other circuits that enable communication of signals according to the second communication protocol, or a combination thereof. The means for communicating according to the second communication protocol, when enabled, may be less energy efficient than the means for communicating according to the first communication protocol.

The apparatus may also include means for selectively enabling the means for communicating according to the second communication protocol for forming the local ad hoc wireless network with a second device based on receipt of a set-up request message, where the set-up request message is received after transmission of the advertisement message. For example, the means for selectively enabling may include the power-saving circuitry 116 or 156 of FIG. 1, the processor 118 or 158 of FIGS. 1-6, the controller 952 or the processor 910 of FIG. 9, other circuits that enable switching communication circuits between a high power state and a low power state, or a combination thereof.

Those of skill would further appreciate that the various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the examples disclosed herein (e.g., one or more operations described with reference to FIGS. 1-9) may be embodied directly in hardware, in a software module executed by a processor, or in a combination of the two. A software module may reside in random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed examples and/or implementation. Various modifications to these examples and/or implementation will be readily apparent to those skilled in the art, and the principles defined herein may be applied to other examples and/or implementation without departing from the scope of the disclosure. Thus, the present disclosure is not intended to be limited to the examples and/or implementation shown herein but is to be accorded the widest scope possible consistent with the principles and novel features as defined by the following claims.

What is claimed is:

1. A method of communicating, the method comprising:
   detecting, at a first device, receipt of an advertisement message at a first communication circuitry while monitoring communications transmitted according to a first communication protocol, the advertisement message having an information element indicating that a second device is capable of participating in a local ad hoc wireless network using a second communication protocol and is available to participate in the local ad hoc wireless network using the second communication protocol;
   based on detecting receipt of the advertisement message, sending a request for information to the second device using the first communication circuitry, wherein the information is associated with communication capabilities of the second device; and
   based on detecting receipt at the first communication circuitry of a message that includes the information, enabling a second communication circuitry of the first device for forming the local ad hoc wireless network between the first device and the second device using the second communication protocol.

2. The method of claim 1, wherein a first operating energy consumption level of the first communication circuitry is less than a second operating energy consumption level of the second communication circuitry, and wherein the advertisement message includes one or more additional information elements indicating capabilities of the second device, services offered by the second device, or both.

3. The method of claim 1, further comprising, after detecting receipt of the message that includes the information, sending a set-up request message to the second device using the first communication circuitry, the set-up request message requesting formation of the local ad hoc wireless network using the second communication protocol.

4. The method of claim 3, further comprising, after the sending the set-up request message:
   receiving, using the first communication circuitry, a set-up confirmation message from the second device;
   enabling the second communication circuitry after the receiving of the set-up confirmation message; and
   exchanging set-up information with the second device using the second communication circuitry, the set-up information associated with the formation of the local ad hoc wireless network using the second communication protocol.

5. The method of claim 3, further comprising, after the sending the set-up request message:
   receiving, using the first communication circuitry, a set-up confirmation message from the second device; and
   exchanging set-up information with the second device using the first communication circuitry, wherein the set-up information is associated with the formation of the local ad hoc wireless network using the second communication protocol, and wherein the second communication circuitry is enabled after exchange of the set-up information.

6. The method of claim 5, further comprising, prior to enabling the second communication circuitry, setting up, with the second device, a local ad hoc wireless network using the first communication protocol, wherein the set-up information associated with the formation of the local ad hoc wireless network using the second communication protocol is exchanged via the local ad hoc wireless network using the first communication protocol.

7. The method of claim 3, further comprising, after the sending the set-up request message or within the set-up request message:
   exchanging a termination criterion with the second device; and
   ceasing attempts to form the local ad hoc wireless network using the second communication protocol in response to the termination criterion being satisfied.

8. The method of claim 1, further comprising determining, using the first communication circuitry, a received signal strength indication associated with the second device, wherein the second communication circuitry is enabled based further on a comparison of the received signal strength indication to a threshold.

9. The method of claim 1, wherein the information element is a single bit in the advertisement message.

10. The method of claim 1, wherein the information includes one or more communication credentials.

11. The method of claim 1, wherein the information includes a communication address.

12. The method of claim 1, wherein the information includes a master device preference indicator or a group owner preference indicator.

13. The method of claim 1, wherein the information includes an operation channel.

14. The method of claim 1, further comprising:
   initiating set-up operations via the second communication circuitry to form the local ad hoc wireless network between the first device and the second device using the second communication protocol;
   determining a number of times that the set-up operations are initiated; and
   responsive to the number of times satisfying a threshold without forming the local ad hoc wireless network between the first device and the second device using the second communication protocol, terminating performance of the set-up operations and sending a notification message to the second device using the first communication circuitry.

15. An apparatus for communicating, the apparatus comprising:
a first transceiver configured to communicate according to a first communication protocol and configured to receive an advertisement message transmitted according to the first communication protocol, the advertisement message having an information element indicating that a second device is capable of participating in a local ad hoc wireless network using a second communication protocol and is available to participate in the local ad hoc wireless network using the second communication protocol, the first transceiver further configured to, based on detecting receipt of the advertisement message, send a request for information to the second device, the information associated with communications capabilities of the second device;
a second transceiver configured to communicate according to the second communication protocol; and
a power-saving circuitry configured to, based on detecting receipt of a message that includes the information at the first transceiver, selectively enable the second transceiver for forming, with the second device, the local ad hoc wireless network using the second communication protocol.

16. The apparatus of claim 15, wherein a first operating energy consumption level of the first transceiver is less than a second operating energy consumption level of the second transceiver, and wherein the first transceiver is configured to, after the message is detected, exchange set-up information associated with formation of the local ad hoc wireless network.

17. The apparatus of claim 15, wherein the first transceiver is configured to communicate in accordance with a Bluetooth® Low Energy (BLE) specification and the second transceiver is configured to communicate in accordance with a Neighbor Aware Network (NAN) specification, configured to communicate in accordance with a WiFi Direct® specification, or both.

18. The apparatus of claim 15, further comprising a decision circuitry configured to determine, based on the information, whether to form the local ad hoc wireless network after detecting receipt of the advertisement message.

19. A non-transitory computer-readable medium storing instructions that are executable by a processor to cause the processor to perform operations comprising:
detecting receipt, at a first communication circuitry, of an advertisement message while monitoring communications according to a first communication protocol, the advertisement message having an information element indicating that a second device is capable of participating in a local ad hoc wireless network using a second communication protocol and is available to participate in the local ad hoc wireless network;
based on detecting receipt of the advertisement message, sending a request for information to the second device using the first communication circuitry, wherein the information is associated with communication capabilities of the second device; and
based on detecting receipt at the first communication circuitry of a message that includes the information, enabling a second communication circuitry for forming, between a first device and the second device, the local ad hoc wireless network using the second communication protocol.

20. The non-transitory computer-readable medium of claim 19, wherein the operations further comprise, after detecting receipt of the message, determining whether to form the local ad hoc wireless network with the second device based on a service to be made available by the second device, a received signal strength indication associated with the second device, a communication capability of the second device, or a combination thereof.

* * * * *